United States Patent [19]

Morgan, Jr.

[11] 4,204,966
[45] May 27, 1980

[54] LIQUID FILTER AND FILTER ELEMENT

[75] Inventor: Howard W. Morgan, Jr., Michigan City, Ind.

[73] Assignee: Filter Specialists, Inc., Michigan City, Ind.

[21] Appl. No.: 174

[22] Filed: Jan. 2, 1979

Related U.S. Application Data

[63] Continuation-in-part of Ser. No. 854,482, Nov. 25, 1977, Pat. No. 4,133,769.

[51] Int. Cl.² .............................................. B01D 29/30
[52] U.S. Cl. .................................... 210/455; 210/477
[58] Field of Search ....................... 210/455, 473–475, 210/477–479

[56] References Cited

U.S. PATENT DOCUMENTS

| 1,786,500 | 12/1930 | McGonigal | 210/474 |
| 3,931,015 | 1/1976 | Jenkins | 210/474 |
| 4,081,379 | 3/1978 | Smith | 210/455 |

Primary Examiner—William A. Cuchlinski, Jr.
Attorney, Agent, or Firm—Oltsch, Knoblock & Hall

[57] ABSTRACT

A liquid filter having a housing which includes a chamber enclosed by a cap. A filter is positioned within the chamber and includes a flange which makes a hermetic seal with the housing.

7 Claims, 12 Drawing Figures

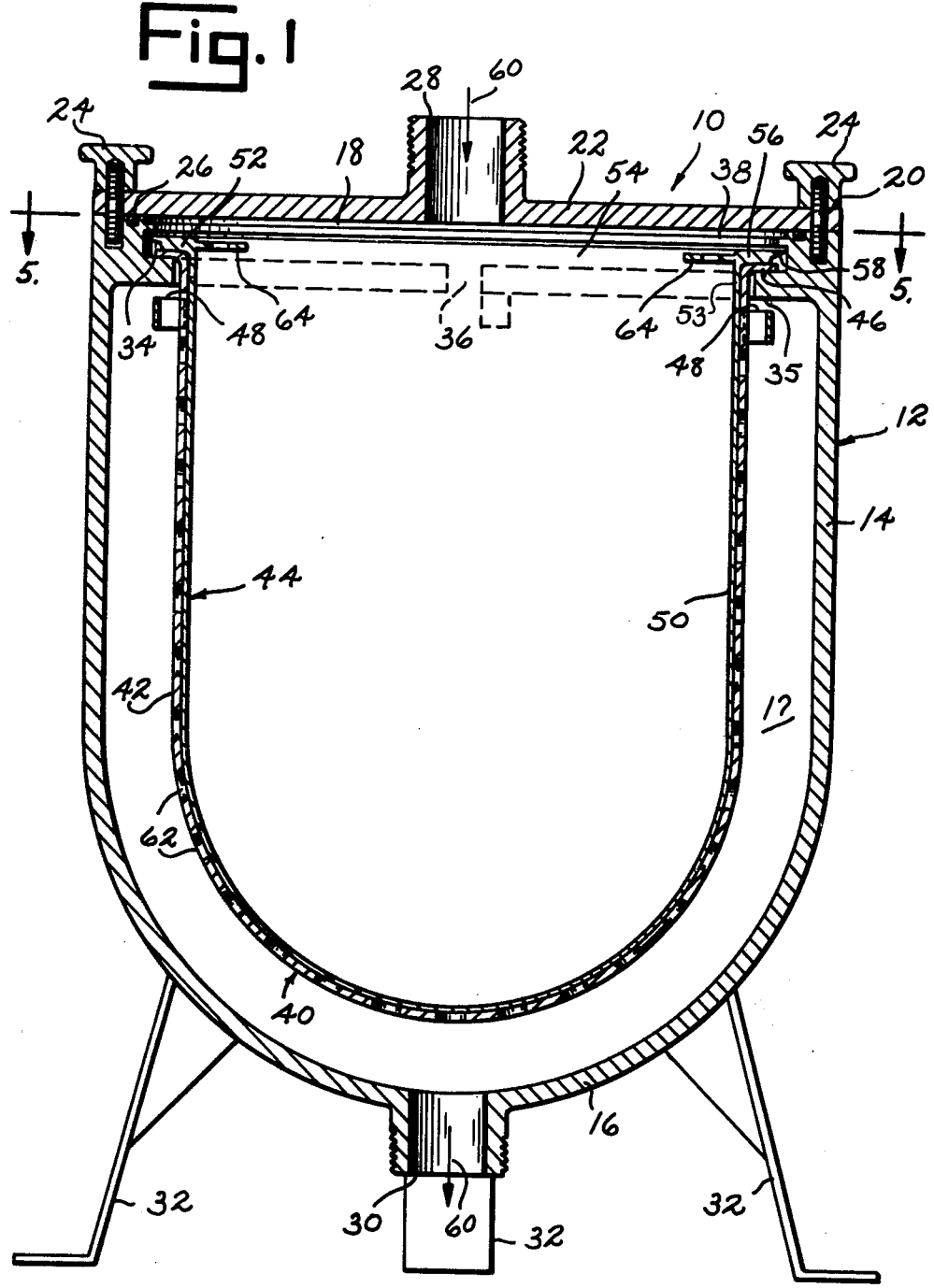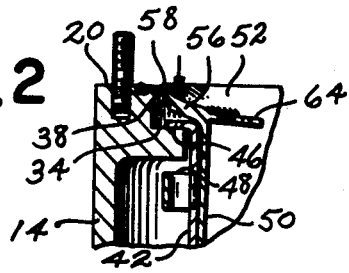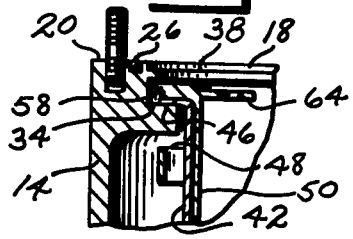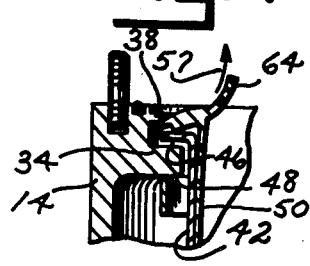

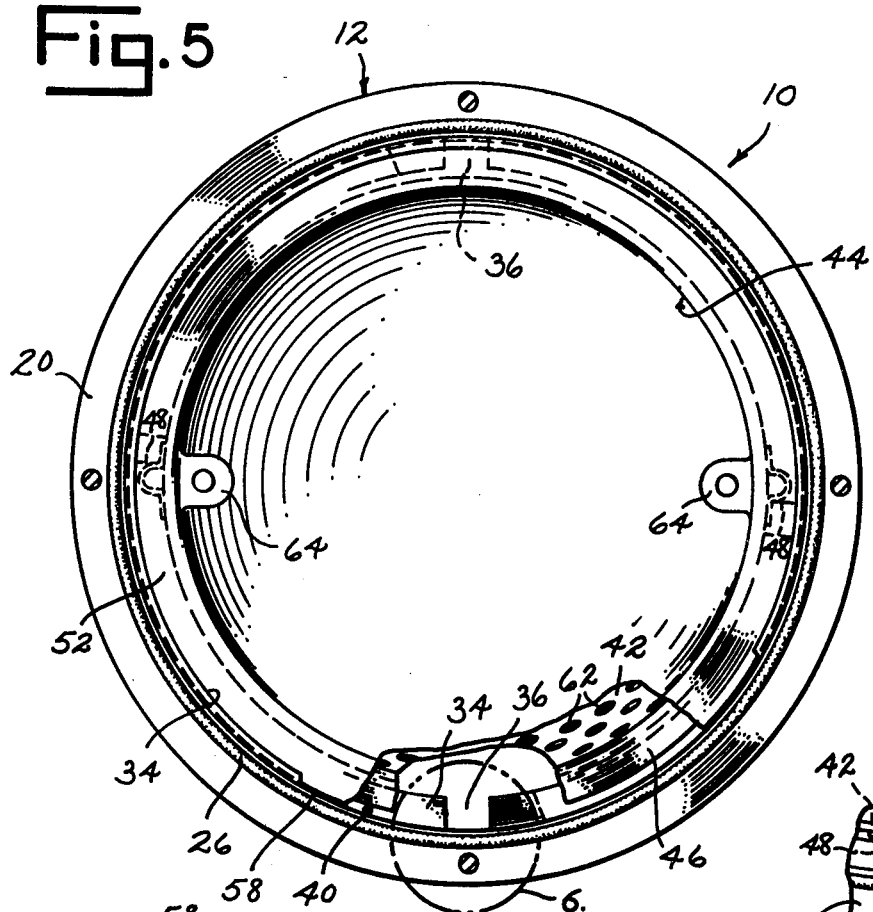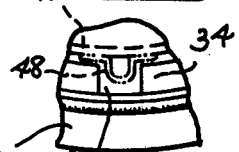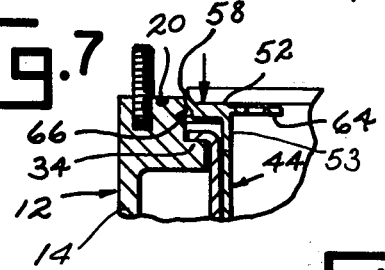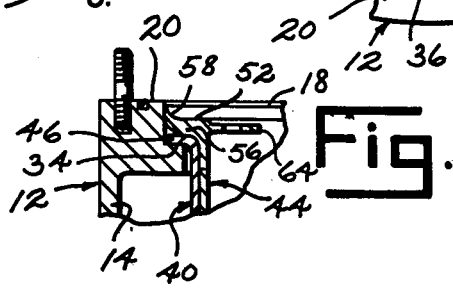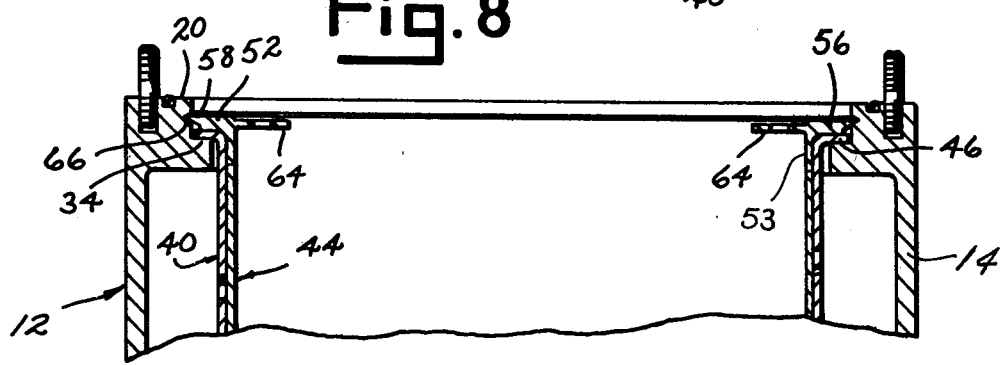

LIQUID FILTER AND FILTER ELEMENT

CROSS REFERENCE TO RELATED APPLICATION

This is a continuation-in-part of application Ser. No. 854,482 filed Nov. 25, 1977, now U.S. Pat. No. 4,133,769 granted Jan. 9, 1979.

SUMMARY OF THE INVENTION

This invention relates to a filter having an improved filter element.

The filter of this invention includes a housing having a side wall which defines a chamber. An opening into the chamber is formed in the housing. A cap spans the chamber opening. A filter element, such as a screen or bag or a bag and screen in combination, is fitted into the housing and engages the housing in such a manner so as to form a liquid seal between the element at its opening and the housing. The filter element can be provided with stops, such as a cam lock, which enables the element to be interlocked with the filter housing.

Accordingly, it is an object of this invention to provide a liquid filter having an improved filter bag.

Another object of this invention is to provide a liquid filter having a reticulated filter element which is fitted and independently retained within the filter housing.

Another object of this invention is to provide a liquid filter having a filter bag which forms a hermetic seal about the bag entrance with the filter housing.

Still another object of this invention is to provide a liquid filter bag having a wall part formed of a flexible liquid pervious material and a ring part formed of a shape-retaining liquid impervious material which is joined to the wall part at an internal lip portion.

Other objects of this invention will become apparent upon a reading of the invention's description.

BRIEF DESCRIPTION OF THE DRAWINGS

FIG. 1 illustrates one embodiment of this invention with the filter shown in vertical sectional form.

FIG. 2 is a fragmentary sectional view showing the filter bag of FIG. 1 being inserted into the filter housing.

FIG. 3 is a fragmentary sectional view showing the filter bag of FIG. 1 seated in the filter housing.

FIG. 4 is a fragmentary sectional view showing the filter of FIG. 1 being removed from the filter housing.

FIG. 5 is a cross sectional view of the filter taken along line 5—5 of FIG. 1 with portions of the filter bag and reticulated basket broken away for purposes of illustration.

FIG. 6 is a view of that portion of FIG. 5 enclosed within broken line circle 6 showing the reticulated basket of the filter in broken lines in proper position to be removed from the filter housing.

FIG. 7 is a fragmentary sectional view of a modified embodiment of the filter showing a filter bag being fitted into the filter housing.

FIG. 8 is a fragmentary sectional view showing the filter embodiment of FIG. 7 with the filter bag seated therein.

FIG. 9 is a fragmentary sectional view showing still another embodiment of the filter with the filter bag seated in the filter housing.

DESCRIPTION OF THE PREFERRED EMBODIMENTS

Figure 10:
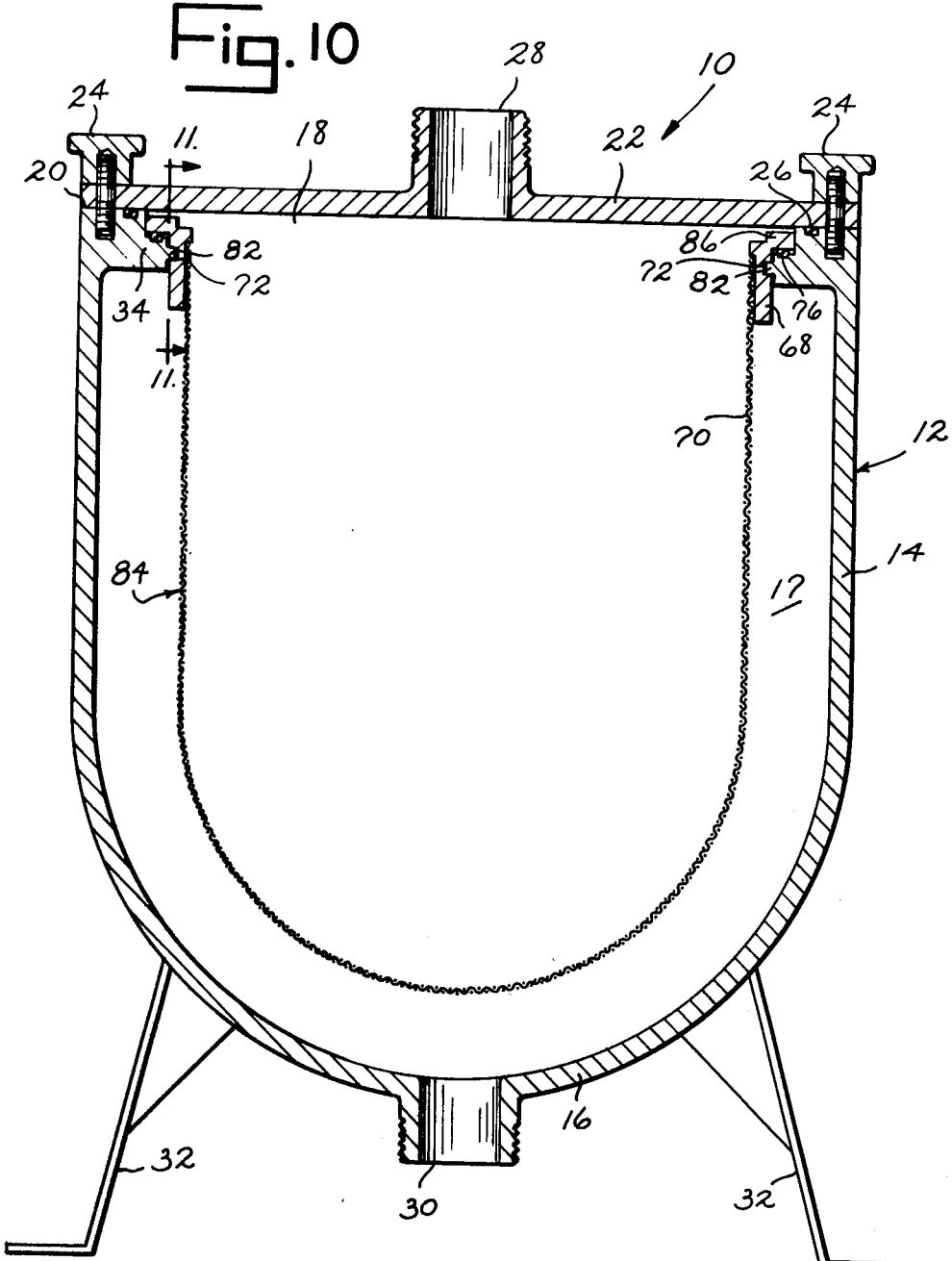
FIG. 10 illustrates another embodiment of this invention with the filter shown in vertical sectional form.

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

Filter 10, shown in FIGS. 1-6, includes a housing 12 having a side wall 14 and a bottom wall 16 defining an internal chamber 17. An opening 18 defined by side wall end edge 20 into chamber 17 is formed in housing 12 and is oppositely located from bottom wall 16 of the housing. A cap 22 spans opening 18 in housing 12. Cap 22 rests upon side wall end edge 20 and is retained in position by a plurality of removable threaded hold-down members 24. An O-ring 26 is placed in compression between cap 22 and housing 12 so as to provide a liquid seal between the cap and housing.

Cap 22 includes an inlet port 28 and bottom wall 16 of housing 12 includes an outlet port 30 by which liquid can flow through filter 10. Legs 32 are connected to housing bottom wall 16 for the purpose of maintaining filter 10 in an upright position during use. Filter 10 thus far described is of a standard, commercially available construction.

Housing side wall 14 carries an annular shoulder 34 which is inset or spaced from end edge 20 of the housing. Shoulder 34 is interrupted at two diametrically spaced locations by slots 36. An annular flange 38 is also carried by side wall 14 of the housing. Flange 38 is spaced from shoulder 34 and is located between the shoulder and end edge 20 of housing 12.

A basket 40 having a reticulated wall 42 is fitted within housing 12. Basket 40 is for the purpose of supporting a filter bag 44 and thus is formed of a rigid shape-retaining construction. An outturned marginal edge or annular flange 46 is formed at the opening into basket 40. The outer diameter of basket flange 46 exceeds the inner diameter of housing shoulder 34, but is less than the inner diameter of housing flange 38 to permit the basket to be removably inserted into the housing through its opening 18, with flange 46 overlying and resting upon shoulder 34. A pair of diametrically located stops 48 are connected to basket wall 42 in a spaced relationship below basket flange 46. Stops 48 are sized so as to pass with clearance through slots 36 in housing shoulder 34 as seen in broken lines in FIG. 6 when the basket is being first inserted into the housing. Once stops 48 have passed through slots 36 and are located below the inner edge 35 of shoulder 34, the basket can be rotated relative to housing 12 to cause the stops to be positioned under an uninterrupted portion of the shoulder, as illustrated in FIGS. 1 and 5. The spacing between stops 48 and overlying basket flange 46 slightly exceeds the thickness of housing shoulder 34 so that when the stops are positioned under an uninterrupted portion of shoulder 34, basket 40 will be prevented from being withdrawn any appreciable distance from the filter housing.

Filter bag 44 includes a wall part 50 which is formed of a flexible, liquid pervious material, such as interwoven nylon, cotton or wool, and a ring part 52 which is formed of a flexible shape-retaining material, such as nylon or polypropylene. Ring part 52 defines the opening 54 into bag 44 and is attached at its annular internal lip 53 to wall part 50, such as by sewing or heat sealing. Bag ring part 52 includes an outturned flange 56 which terminates into a tapering lip 58. The diameter across the opening 54 into bag 44 as measured diametrically across the outer edge of lip 58 just slightly exceeds the inner diameter of side wall 14 of the filter housing as measured above housing shoulder 34 between the shoulder and over-lying flange 38.

With filter cap 22 removed and basket 40 supported upon shoulder 34 at its flange 46, bag 44 is inserted into the basket with lip 58 of the bag being flexed first upwardly and then around protruding flange 38 of the housing, as illustrated in FIGS. 2 and 3. Flange 56 of bag 44 fits between flange 38 and shoulder 46 of basket 40 with the outer edge of lip 58 of the flange making peripheral liquid sealing contact with side wall 14 of the housing. Liquid flow as indicated by arrows 60 in FIG. 1 will cause flange 56 of bag 44 to press downwardly against flange 46 of basket 40, thereby firmly positioning the basket within housing 12 so that the liquid first enters the interior of bag 44 from filter inlet port 28 and thereafter passes through pervious filtering wall part 50 of the bag and openings 62 in basket 40 and out outlet port 30.

Ring part 52 of bag 44 includes a pair of tabs 64 which are integrally formed to flange 56 of the bag. Tabs 64 when pulled outwardly as shown by arrow 57 in FIG. 4 with cap 22 removed from the filter cause flange 56 to be flexed and cammed inwardly and pulled from engagement with housing flange 38 to release the bag from the filter for purpose of replacement or cleaning. Wall part 50 of the bag will usually adhere to basket 40 during initial efforts to remove it from the filter. This bag-basket adherence causes the basket to move toward opening 18 in housing 12 until basket stops 48 engage the inner edge 35 of housing shoulder 34 where further outward movement of the basket is prevented as bag 44 is pulled from the basket.

In FIGS. 7 and 8 a modified form of the filter shown in FIGS. 1-6 is illustrated. In this embodiment, housing 12 is modified by the elimination of flange 38 and the introduction of an annular interior groove 66 between shoulder 34 and end edge 20 of the housing. The diameter of housing side wall 14 at the place of maximum depth of groove 66 is slightly less than the outer diameter of bag 44 as measured across the outer edge of its lip 58. Ring part 52 of bag 44 is wedged into housing 12 with lip 58 being flexed outwardly, as seen in FIG. 7, until groove 66 of the housing is reached. Lip 58 then springs into groove 66 to interlock the bag with the filter housing, as seen in FIG. 8, with flange 56 of the bag overlying and preferably contacting basket flange 46. In this embodiment, the compressive fit of bag lip 58 into housing groove 66 forms a liquid seal between the bag and the housing. The operation of the filter in the embodiment shown in FIGS. 7 and 8 is similar to the operation of the embodiment illustrated in FIGS. 1-6. Bag 44 shown in FIGS. 7 and 8 can be removed from basket 40 by an outward pull upon tabs 64.

In FIG. 9 another embodiment of this invention is illustrated. In this embodiment side wall 14 of housing 12 is provided with a straight internal surface between shoulders 34 and end edge 20. The inner diameter of side wall 14 between shoulder 34 and end edge 20 is less than the outer diameter of bag lip 58. Ring part 52 of bag 44 is wedged into housing 12 with lip 58 contacting housing side wall 14 above shoulder 34. This wedge fit between bag 44 and housing 12 not only forms an annular peripheral liquid seal between lip 58 of the bag and side wall 14 of housing 12, but also causes flange 56 of the bag to overlie and preferably contact outturned flange 46 of basket 40 to urge the basket into contact with housing shoulder 34. When cap 22 of the filter has been secured to housing 12 over its opening 18, liquid flow through the filter will cause pressure to be brought against the outer surface of bag lip 58 to enhance the seal between the lip and side wall 14 of filter housing 12. Bag 44 in the embodiment shown in FIG. 9 can be removed with an upwardly pull upon tabs 64 of bag 44.

In each of the above described embodiments of FIGS. 1-9, the engagement of bag lip 58 with housing 12 forms substantially a hermetic seal between filter bag 44 and the housing at bag ring part 52. This causes the liquid level within the filter to remain no higher than the bottom of lip 53 of bag ring part 52 upon removal of cap 22, allowing access to tabs 64 when it is desirable to remove the filter bag.

By joining wall part 50 to ring part 52 of filter bag 44 at lip 53 of the ring part, the diameter of the wall part can be precisely sized to accommodate the filter housing opening. This improves the filtering efficiency of the filter.

Figure 11:
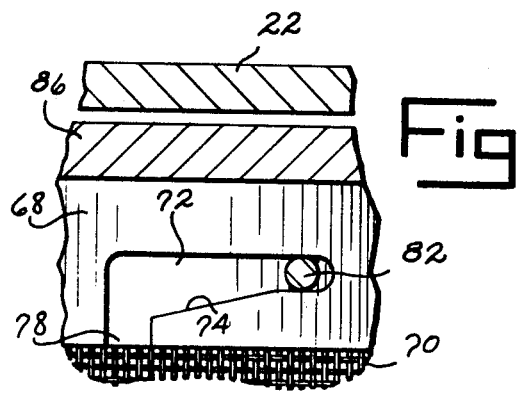
FIG. 11 is a fragmentary sectional view taken along line 11—11 of FIG. 10.
Figure 12:
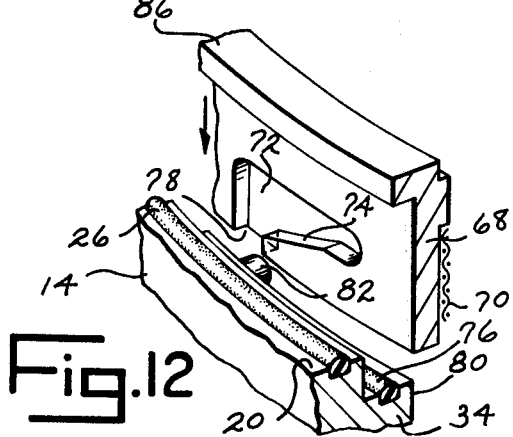
FIG. 12 is a fragmentary perspective view of the filter housing and filter screen locking components shown in separated form.

The filter embodiment illustrated in FIGS. 10-12 includes a housing 12 having a side wall 14 and a bottom wall 16 defining an internal chamber 17. An opening 18 defined by side wall end edge 20 into chamber 17 is formed in housing 12 and is oppositely located from bottom wall 16 of the housing. A cap 22 spans opening 18 in housing 12. Cap 22 rests upon side wall end edge 20 and is retained in position by a plurality of removable threaded hold-down members 24. An O-ring 26 is placed in compression between cap 22 and housing 12 so as to provide a liquid seal between the cap and housing.

Cap 22 includes an inlet port 28 and bottom wall 16 of housing 12 includes an outlet port 30 by which liquid can flow through filter 10. Legs 32 are connected to housing bottom wall 16 for the purpose of maintaining filter 10 in an upright position during use. Housing side wall 14 carries an annular shoulder 34 which is spaced from end edge 20 of the housing. Shoulder 34 includes an end face 80 which carries diametrically opposed pins 82.

A filter screen 84 is fitted within housing 12. Screen 84 includes an annular shape-retaining liquid impervious flange 86 and a wall. The wall of screen 84 includes a rigid ring part 68 joined to flange 86 and an enclosed reticulated filtering part 70 which may be of a woven wire, plastic or cloth material. Ring part 68 has two diametrically located slots 72 formed in it. Each slot 72 includes a cam surface 74. An O-ring 76 is carried upon shoulder 34.

To assemble screen 84, the screen is inserted into housing chamber 17 through opening 18. The openings 78 into screen slots 72 are aligned with pins 82 and screen 84 positioned with the pins located in the longitudinal portions of the slots. The screen is then turned relative to housing 12 to cause the pins to slidably engage cam surfaces 74 of the slots which urges screen flange 82 toward housing shoulder 34. This compresses O-ring 76 between flange 82 and shoulder 34 to form a circumferential liquid seal between housing 12 and screen 84. Screen 64 is removed from housing 12 by reverse turning of the screen.

In some embodiments screen 84 may be designed to carry the pins while housing shoulder end face 80 has the accommodating slots formed in it. Also the number of pins and accommodating locking slots can vary depending upon the size of the filter. Also a filtering bag could be used with screen 84.

In some embodiments of this invention the filter could be designed so that both the inlet and outlet ports of the filter are incorporated into the filter housing and not the filter cap. Further, it is to be understood that this invention is not to be limited to the details above given and described, but may be modified within the scope of the appended claims.

What I claim is:

1. In a liquid filter including a housing having a side wall defining a chamber therein, said chamber having an opening, an annular support carried by said housing and defining at least in part said chamber opening, an inlet port and an outlet port, the improvement comprising a filter bag having a wall part formed of a flexible liquid pervious material and a ring part formed of a shape-retaining liquid impervious material, said bag ring part including an annular lip defining the opening into said filter bag and an outturned annular flange, said bag wall part joined to said lip of the bag ring part, said filter bag fitting in said chamber with its wall part extending through said chamber opening within the path of liquid flow between said inlet and outlet ports and with its said ring part flange contacting said support, said ring part flange forming (at all times when contacting said support) a circumferential hermetic seal between said ring part and housing.

2. The liquid filter of claim 1, wherein said ring part flange forms said circumferential hermetic seal between said ring part and said housing at all times when contacting said support.

3. The liquid filter of claim 2 and a reticulated basket having an opening therein defined by a marginal edge, said basket fitted within said chamber and spaced from said housing side wall, said bag wall part extending into said basket and having said ring part flange of the bag overlying said basket marginal edge, said basket marginal edge constituting a part of said support for said filter bag.

4. In a liquid filter including a housing having a side wall defining a chamber therein, said chamber having an opening, a cap spanning said chamber opening, an inlet port and an outlet port, the improvement wherein said housing includes an annular shoulder located adjacent said chamber opening and spaced from said cap, said shoulder projecting into the interior of said chamber and there terminating in an end face, a removable filtering basket including an annular flange carried by said shoulder and a wall joined to said basket flange, said basket wall having reticulated parts spaced from said housing side wall, said inlet and outlet ports located in liquid flow communication through said basket wall reticulated parts, camming means associated with said housing shoulder and basket for urging said basket flange toward said housing shoulder upon rotation of the basket relative to the housing.

5. The liquid filter of claim 4 and an annular resilient seal supported upon said housing shoulder, said basket flange urged into liquid sealing contact with said seal.

6. The liquid filter of claim 4 wherein said camming means includes a pin carried by one of said basket wall and housing shoulder end face and a slot defined by a cam side surface formed in the other of said basket wall and housing shoulder end face to receive said pin upon insertion of the basket into said housing, said pin fitting into said slot in contact with said slot side surface.

7. The liquid filter of claim 6 and at least two pins carried by said one basket wall or housing shoulder end face, at least two slots each defined by a cam side surface formed in said other basket wall or housing shoulder end face, each pin fitting into a said slot in contact with the side surface thereof.

* * * * *

UNITED STATES PATENT AND TRADEMARK OFFICE
CERTIFICATE OF CORRECTION

PATENT NO. : 4,204,966
DATED : May 27, 1980
INVENTOR(S) : Howard William Morgan, Jr.

It is certified that error appears in the above-identified patent and that said Letters Patent are hereby corrected as shown below:

In lines 16-17 of Claim 1 (column 5, lines 32-33 of Patent) delete:

"(at all times when contacting said support)"

Signed and Sealed this

Fifth Day of August 1980

[SEAL]

Attest:

SIDNEY A. DIAMOND

Attesting Officer

Commissioner of Patents and Trademarks

REEXAMINATION CERTIFICATE (2517th)
United States Patent [19]
Morgan, Jr.

[11] B1 4,204,966
[45] Certificate Issued Apr. 4, 1995

[54] LIQUID FILTER AND FILTER ELEMENT

[75] Inventor: Howard W. Morgan, Jr., Michigan City, Ind.

[73] Assignee: Filter Specialists, Inc., Michigan City, Ind.

Reexamination Request:
No. 90/003,139, Jul. 22, 1993

Reexamination Certificate for:
Patent No.: 4,204,966
Issued: May 27, 1980
Appl. No.: 174
Filed: Jan. 2, 1979

Certificate of Correction issued Aug. 5, 1980.

Related U.S. Application Data

[63] Continuation-in-part of Ser. No. 854,482, Nov. 25, 1977, Pat. No. 4,133,769.

[51] Int. Cl.⁶ .................................................. B01D 29/27
[52] U.S. Cl. ............................... 210/455; 210/477
[58] Field of Search ............... 210/172, 232, 315, 317, 210/445, 448, 450, 451, 452, 455, 473—475, 477–479, 484, 485, 489, 495, 499, 238, 471; 55/378, 379, 502

[56] References Cited

U.S. PATENT DOCUMENTS

| | | | |
|---|---|---|---|
| 1,604,048 | 10/1926 | Hobbs | 210/474 |
| 2,331,332 | 10/1943 | Latta | 55/373 |
| 2,351,526 | 6/1944 | Lebus | 210/172 |
| 2,352,300 | 6/1944 | Walker et al. | 210/445 |
| 2,559,983 | 7/1951 | Miller | 15/313 |
| 3,230,569 | 1/1966 | Nielsen | 15/344 |
| 3,335,917 | 8/1967 | Knight | 222/189 |
| 3,513,500 | 5/1970 | Hori | 15/344 |
| 3,771,664 | 11/1973 | Schrink et al. | 210/448 |
| 3,814,261 | 6/1974 | Morgan, Jr. | 210/453 |
| 3,931,015 | 1/1976 | Jenkins | 210/232 |
| 4,024,065 | 5/1977 | Morgan, Jr. | 210/315 |
| 4,073,632 | 2/1978 | Reinauer et al. | 55/374 |
| 4,081,379 | 3/1978 | Smith | 210/232 |
| 4,089,664 | 5/1976 | Noland | 55/341.1 |

FOREIGN PATENT DOCUMENTS

966235 8/1964 United Kingdom .................. 55/378

*Primary Examiner*—Matthew O. Savage

[57] ABSTRACT

A liquid filter having a housing which includes a chamber enclosed by a cap. A filter is positioned within the chamber and includes a flange which makes a hermetic seal with the housing.

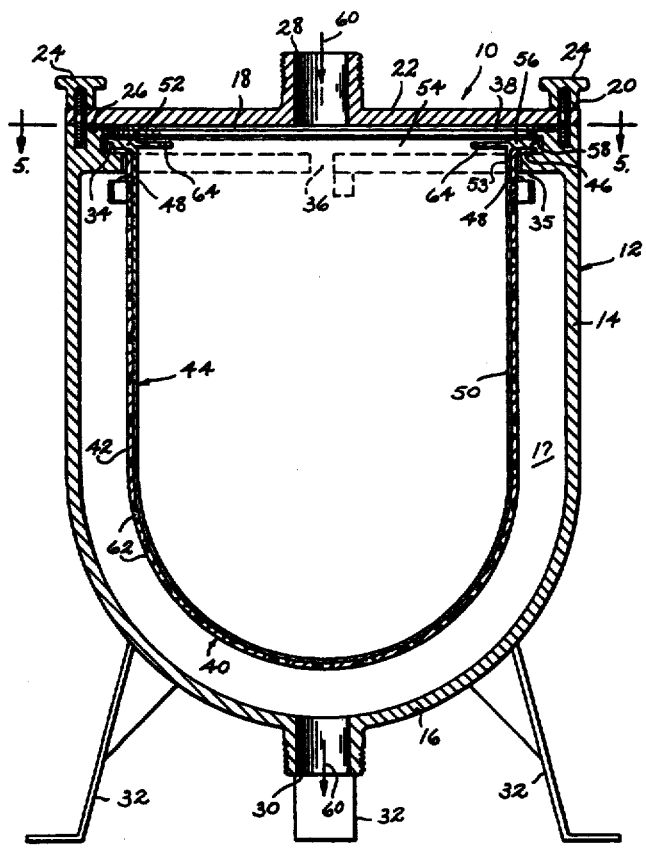

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 3, 6 and 7 is confirmed.

Claims 1, 2, 4 and 5 are cancelled.

New claim 8 is added and determined to be patentable.

8. *In a liquid filter including a housing having a side wall defining a chamber therein, said chamber having an opening, an annular support carried by said housing and defining at least in part said chamber opening, an inlet port and an outlet port, the improvement comprising a filter bag having a wall part formed of a flexible liquid pervious material and a ring part formed of a shape-retaining liquid impervious material, said bag ring part including an annular lip defining the opening into said filter bag and an outturned flexible annular flange, and a pair of spaced generally opposed tab means integrally formed with and extending inwardly from said ring part flange toward the center of said filter bag opening, said bag wall part joined to said lip of the bag ring part, said filter bag fitting in said chamber with its wall part extending through said chamber opening within the path of liquid flow between said inlet and outlet ports and with its said ring part flange contacting said support, said ring part flange forming a circumferential hermetic seal between said ring part and housing, said tab means when pulled outwardly relative to said chamber opening for flexing said ring part flange and camming the ring part flange inwardly toward the center of said filter bag opening to release said bag from said filter.*

\* \* \* \* \*